United States Patent [19]

Coffin

[11] Patent Number: 5,594,673

[45] Date of Patent: Jan. 14, 1997

[54] METHOD AND APPARATUS FOR DISPLAYING MENU OPTIONS FOR SELECTION WITH A MINIMUM OF KEY STROKE

[75] Inventor: Daniel R. Coffin, Corvallis, Oreg.

[73] Assignee: Hewlett-Packard Company, Palo Alto, Calif.

[21] Appl. No.: 513,414

[22] Filed: Aug. 15, 1995

Related U.S. Application Data

[63] Continuation of Ser. No. 14,309, Feb. 5, 1993, abandoned.

[51] Int. Cl.⁶ .............................. G06F 3/00; G06F 15/02
[52] U.S. Cl. .................................. 364/709.15; 364/706
[58] Field of Search ...................... 364/709.01, 709.04, 364/709.14, 709.15, 710.01, 710.07, 709.16, 406, 408, 706

[56] References Cited

U.S. PATENT DOCUMENTS

| | | | |
|---|---|---|---|
| 4,333,097 | 6/1982 | Buric et al. .......................... | 340/711 |
| 4,634,970 | 1/1987 | Payne et al. ......................... | 334/121 R |
| 4,821,211 | 4/1989 | Torres ................................. | 395/156 |
| 4,836,699 | 6/1989 | Babsch et al. ....................... | 400/479 |
| 4,845,652 | 7/1989 | Bunsen .............................. | 364/709.14 |
| 4,852,000 | 7/1989 | Webb et al. ......................... | 364/406 |
| 5,020,012 | 5/1991 | Stockberger et al. ............... | 364/709.14 |
| 5,067,102 | 11/1991 | Eisenstein ...................... | 364/709.06 X |
| 5,216,627 | 6/1993 | McClellan et al. ............ | 364/709.01 X |

FOREIGN PATENT DOCUMENTS

| | | | |
|---|---|---|---|
| 0310699 | 4/1989 | European Pat. Off. .......... | G06F 3/02 |
| 2131746 | 6/1984 | United Kingdom ............... | B41J 5/10 |

*Primary Examiner*—Roy N. Envall, Jr.
*Assistant Examiner*—Chuong D. Ngo

[57] ABSTRACT

A calculating device enables a user to select among multiple menu options by displaying a two dimensional array of menu options. A user can select among rows of the array by pressing a selector key that causes a selected row to be highlighted and reproduced in a menu label row on a display corresponding to menu keys on a keyboard. The user may select a menu option by pressing a menu key aligned with the corresponding menu label.

18 Claims, 2 Drawing Sheets

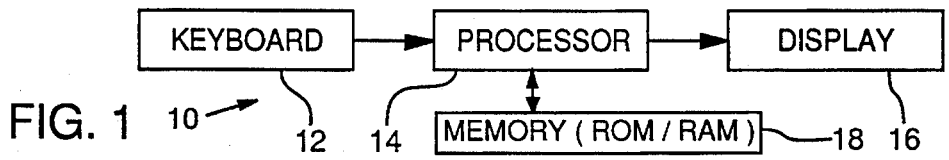
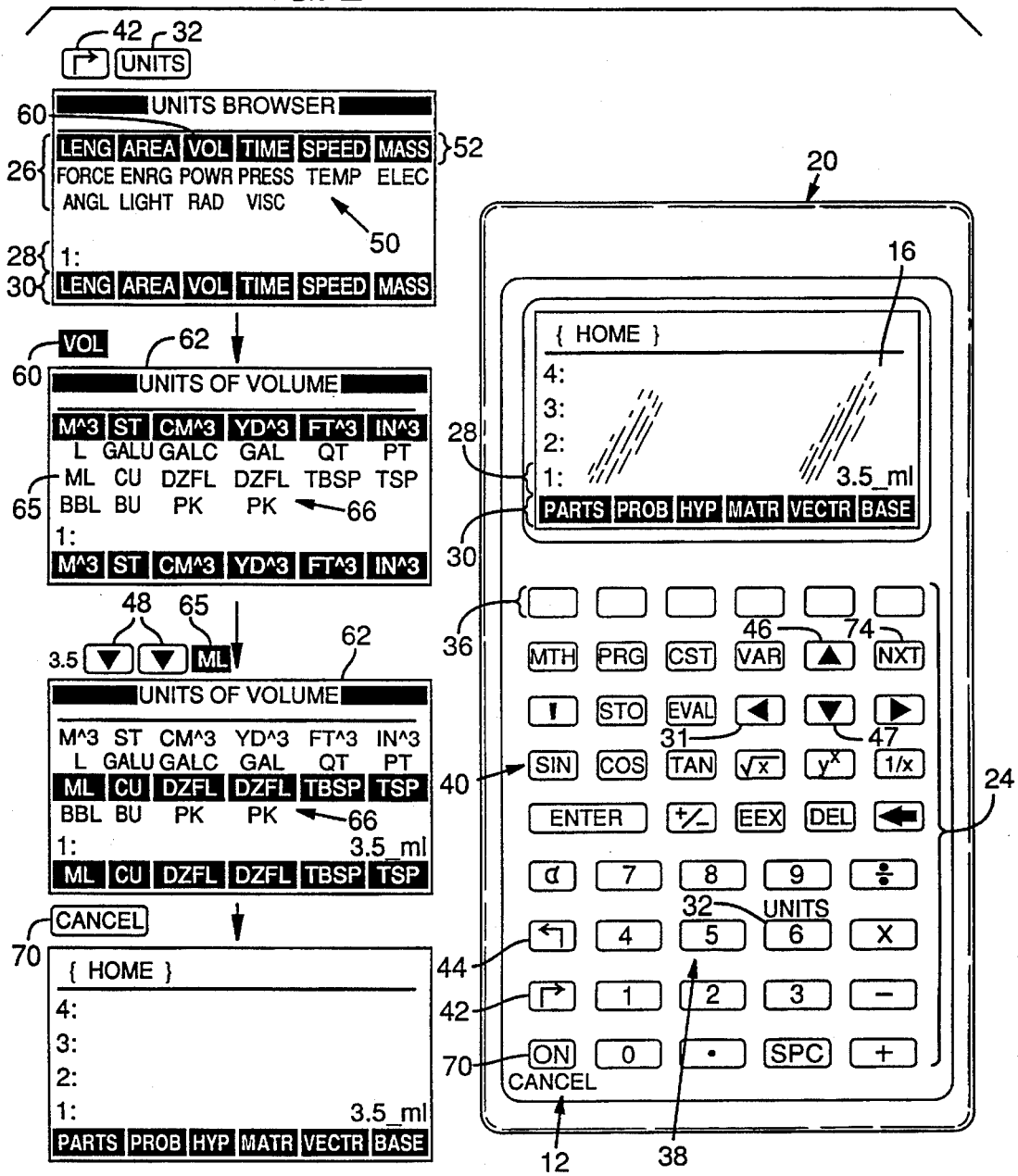

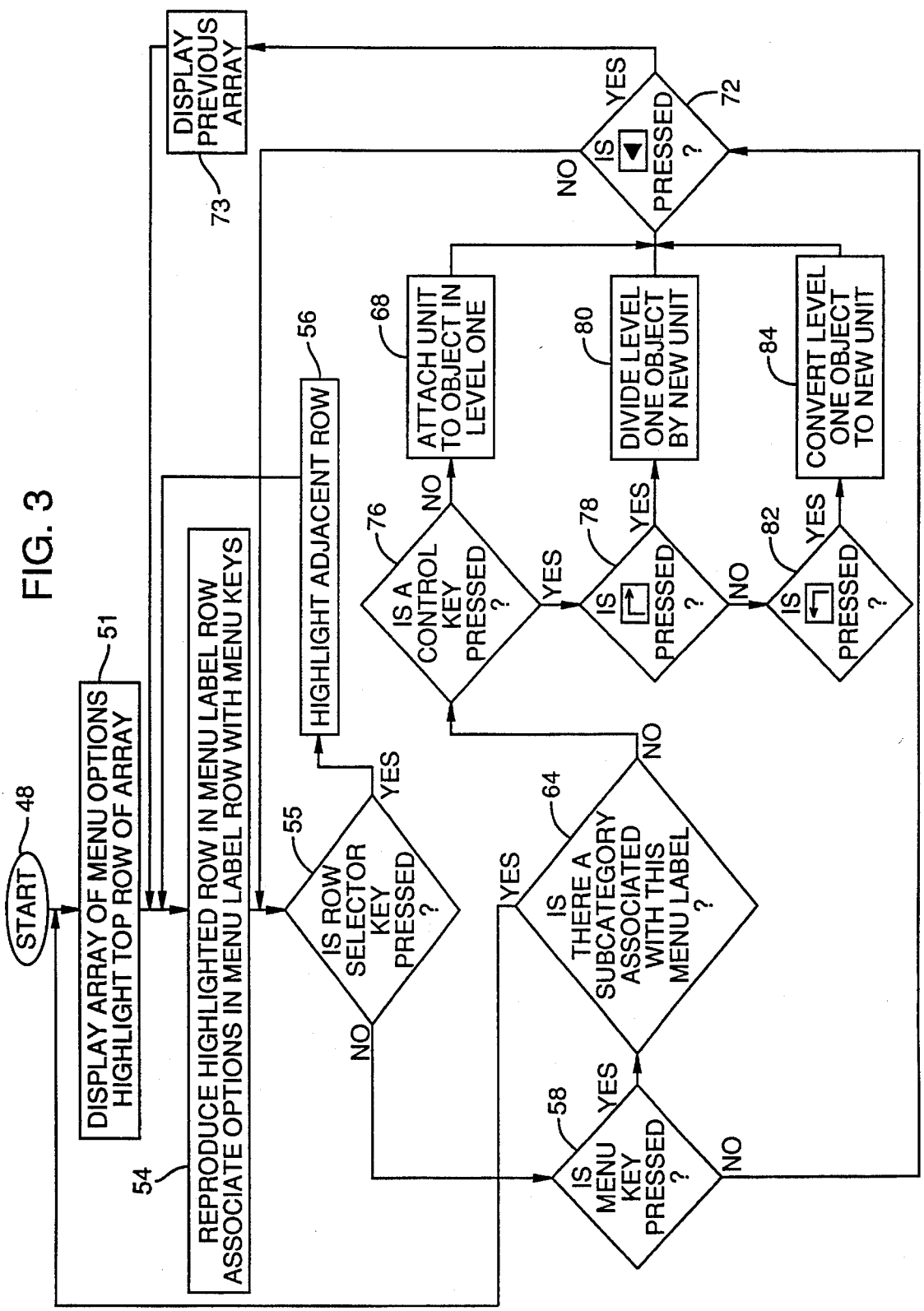

METHOD AND APPARATUS FOR DISPLAYING MENU OPTIONS FOR SELECTION WITH A MINIMUM OF KEY STROKE

CROSS REFERENCE TO THE RELATED APPLICATIONS

This application is a continuation of application Ser. No. 08/014,309, filed Feb. 5, 1993, now abandoned.

BACKGROUND OF THE INVENTION

This invention relates generally to calculators and equivalent calculating devices. More particularly, this invention relates to a novel technique for displaying a large number of menu options in a limited screen area for selection with a minimum number of key strokes.

Calculators, palmtop computers and other equivalent compact calculating devices by their nature have keyboards with a limited number of keys. To increase the number of functions, or actions, for a key, such devices often employ shift or modifier keys, one of which is pressed immediately before or simultaneously with pressing the key of interest to select the key's desired function. The various functions available for a key are usually written on the key and immediately above and below it on the keyboard in colors that correspond to the colors of modifier keys. For example, many newer calculators have a primary, or unshifted, function that is written in white on the key; a first secondary, or shifted, function written in red above the key; and a second secondary function written in blue below the key. As a practical matter, however, a key can be given no more than three or four functions because of the limited space for writing the functions on and around each key.

To further increase the number of functions a calculator can execute, menu keys ("soft keys") have been added to keyboards, typically as a row of keys placed immediately below the calculator display screen. Menus of functions may then be selected and displayed as labels above the menu keys, with each menu key associated with a label. Menu keys and the technique for displaying menus of associated labels are shown and described in U.S. Pat. No. 5,020,012, which is hereby incorporated by reference.

The drawback of present menu-based techniques is the difficulty in associating a menu option as a label with a menu key when there are more options than menu keys. For example, typically the row of menu keys consists of six keys. If the menu relates to linear units such as meters, yards, feet, inches, etc. that are to be appended to a displayed scalar value, the menu may include many more than six options. The user must then choose which six of the options he desires to be associated as labels with the menu keys.

Several prior solutions to this selection problem have been tried, each with disadvantages. A common approach is to arrange related options into a group and then display subgroups of this group corresponding in number to the number of menu keys. To access an option of the group, one then presses a key that causes the successive display of the subgroups as menu labels. After the display of a final subgroup, the calculator display re-displays a first subgroup. The disadvantage of this approach is that the user cannot see an entire group of related options at once and thus may forget where an option is located. He must also use a relatively large number of key strokes to find a desired menu option.

A second approach is to arrange the menu options in a hierarchy, where each menu label in a row represents a submenu of labels. Pressing a menu key brings up a submenu, with its options now associated as labels with the menu keys. The initial labels may indicate visually that they represent a group of related submenu options. The disadvantages of this approach include finding an acceptable grouping of functions obvious to a user and the need for a large number of key presses to find the desired option.

SUMMARY OF THE INVENTION

An object of the invention, therefore, is to provide an improved technique for displaying and selecting menu options for a calculating device, which overcomes drawbacks of the prior art.

Another object of the invention is to provide such a technique that enables the user to consider a wide range of menu options and select among them with a minimum number of key strokes.

To achieve these objects, the invention provides a calculating device, capable of displaying an array of menu options, and a method for selecting menu options in a calculating device. The calculating device comprises a display unit, a keyboard having a plurality of keys, and a programmed data processor responsive to a command entered at the keyboard. The keyboard includes menu keys, and each menu key is associated with a menu label displayed on the display unit. In response to a command entered at the keyboard, the programmed data processor displays on the display unit a multiple row array of menu options. The data processor displays the menu options for the menu keys in a manner indicating which of the rows of menu options presently comprises the menu labels for the menu keys.

The invention provides a method for selecting menu options in a calculating device. The method includes displaying simultaneously on the display unit menu options in a multiple row array in response to a command from the keyboard. The method further includes indicating which row of the menu options in the array presently comprises menu labels for the menu keys. In response to selection of a different row, the method includes indicating that the different row presently comprises the menu labels for the menu keys. The method may also include executing an action represented by a menu label for a menu key in response to pressing the menu key.

In particular, the invention enables the user of a calculating device to select, with a minimum of key strokes, menu options from a two-dimensional array displayed on the display unit. The display of the array of menu options conveys sufficient information to enable the user to select an option without memorizing key stroke sequences or unique categories of functions or symbols.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is a block diagram of a conventional computer system or calculator programmed in accordance with the invention.

FIG. 2 is a front view of a calculator according to the present invention, including a series of screen displays illustrating the operation of the invention.

FIG. 3 is a flow chart that illustrates the programmed operation of the invention.

DETAILED DESCRIPTION OF THE INVENTION

Apparatus

Referring now to the drawings, FIG. 1 is a block diagram of the architecture of a conventional computer system 10 such as a calculator. This system includes an electronic keyboard 12 operably coupled to a processor 14 to communicate key strokes to the processor 14. The processor is operably coupled to a display unit 16 for displaying characters and graphical output generated by the processor 14. Examples of display units include, but are not limited to, video terminals, LED (light emitting diode), or LCD (liquid crystal display) screens. The processor 14 is also operably coupled to memory 18, in which is stored computer programs for operating the computer system 10 and for carrying out applications. Depending on the nature of the system, memory 18 may include either or both RAM (random access memory) and ROM (read only memory). It should be understood that the invention, to be described, is not limited to use with this particular architecture, but may be used with other types of computer systems as well.

FIG. 2 is a front view of a calculator 20 according to the present invention and several successive views of displays on an LCD display unit 16 within the calculator. The LCD display unit of the preferred embodiment, while adapted for the compact interface of a hand held calculator, is capable of displaying several rows and columns of menu options 26. These menu options may include options for executing mathematical functions or programmable commands, displaying symbols on the display unit, entering data, etc. The LCD display unit 16 of the preferred embodiment may display an array of menu options 26, including a plurality of rows and columns, a command line 28, and a menu label row 30. Although the rows and columns are preferably linear, they may be offset to some degree so long as they are recognizable as separate groups. The menu label row 30 displays a selected row of menu options as menu labels associated with a row of menu keys 36 on keyboard 12.

The keyboard 12 includes a set of pressable keys 24 that enables a user to enter data into memory 18, perform mathematical and calculator control functions, and to select menu options. The keyboard 12 has keys 31, 32 for selecting an array of menu options for display, row selector keys 46, 47 for selecting a row among a plurality of rows in the array 26 as menu labels in the menu label row 30, and the menu keys 36 associated with the menu labels in the menu label row 30. Additionally, the keyboard 12 contains a plurality of numeral, or digit, keys 38 and functions keys 40, and each key may correspond to more than one numeral or function. The keyboard 12 also includes control keys, shown as right and left shift keys 42, 44 in FIG. 2, that enable the numeral and function keys 38, 40 to provide secondary functions.

The user may display a two dimensional menu comprising an array of menu options such as shown in FIG. 2 by pressing a control key in combination with another key. For example, a user may press keys 42, 32 to display a menu of units. It should be understood, however, that there are numerous possible ways to initiate the display of an array of menu options, such as by pressing a single key or other combinations of keys. As described below, a user may then access submenus of related options by pressing a menu key after initiating the display of a main menu. Once a user has displayed a submenu on the display unit, the user may then switch to a previously displayed menu by pressing a selector key shown as left arrow key 31 in FIG. 2.

The keyboard further includes row selector keys 46, 47 for selecting a row among a plurality of rows in the array. In FIG. 2, for example, a user selects a row of menu options pressing a row selector key to move the highlight up or down through the array. The selected row then appears as the menu key labels in menu label row 30. In a preferred embodiment, the row selector keys are up arrow key 46 and down arrow key 47 in FIG. 2. Other key techniques are, of course, possible. For example, a user could select rows by depressing dedicated keys or specific combinations of keys. In the preferred embodiment shown in FIG. 2, a user may toggle among rows by repeatedly pressing the up and down arrow keys 46, 47.

The menu keys 36, located adjacent to the display unit 16, are associated with the row of menu options displayed as menu labels in the menu label row 30. The calculator 20 has six menu keys 36, each aligned vertically with a menu label in the menu label row 30. While a preferred embodiment provides a row of menu keys adjacent to the display unit 16, the menu keys could also be any keys on the keyboard so long as that key is readily identified with a menu option. For example, keys could be marked with characters or letters corresponding to letters in a menu option on the display. To select a menu option, a user would then select an option by pressing a key (or a control key in combination with a key) identified by a letter or symbol contained in the desired menu option.

Operation

In operation, the calculator 20 displays a two-dimensional array of menu options in response to pressing a key on the keyboard 12, such as key 32. A user then selects a row as a menu label row by pressing a row selector key 47 until the desired row is highlighted in the display. The user then selects a particular function in the row 30 by pressing the menu key 36 associated with the corresponding menu label. One may better understand the operation of the invention by considering an example. Adjacent to the calculating device, FIG. 2 shows successive illustrations of displays as a user accesses a desired menu option. FIG. 3 is a flow chart that illustrates the programmed operation of the calculator 20. The particular illustration in FIG. 2 and accompanying flow chart of FIG. 3 show how a user may create a scientific unit, append the unit to a numeric value, and enter the resulting data into memory such that the data may be processed in a calculation. For the sake of clarity, the process steps of FIG. 3 are indicated by numerals in parentheses below.

FIG. 3 illustrates the logic included in the particular unit-building application. In general, a user may execute the process of accessing a menu option whenever the processor 14 pauses after executing a routine or instruction and prompts the user for an input. In the particular units building application, the user may build a unit when the processor solicits inputs from a "home" display or during calculations requiring input of a unit (48).

Referring now to the display illustrations of FIG. 2 and the flow chart of FIG. 3, a user first selects the menu of units for display by pressing the right shift control key 42 in combination with the UNITS key 32. In response, the processor 14 displays a main units array 50 (51). At this point, the display shows an array of possible unit types, a command line 28 for displaying selected data, and a menu label row 30 below the command line. The top row 52 of the array is highlighted (51) and is reproduced in the menu label row 30 such that the menu options of the top row 52 are the menu labels of row 30 (54). The processor 14 may then execute programs corresponding to the menu options of the menu label row 30 when a user presses an associated menu key 36.

The user selects among the rows of the array 50 by pressing the up or down row selector keys 46, 47. When a user depresses a row selector key 46, 47 (55), the processor 14 causes an adjacent row to be highlighted (56). The processor reproduces the highlighted row in the menu label row 30 such that the processor associates menu options representing programs in memory with the menu keys (54). The display unit 16 continues to display the array and enables the user to select among rows (55) until the user presses a menu key 36 (58). It should be understood that the display unit 16 could display the entire array 50 at once, or if the array size exceeds the capacity of the display unit 16, the display unit could display a portion of the array fitting on the display unit 16 above the command line 28 and menu label row 30.

Referring now to FIG. 2, the drawing of successive displays shows the key stroke sequence for creating the numeral 3.5 with the unit of volume, milliliters (ml), attached. Having obtained the units array, the display includes a two dimensional array of physical quantities 50, in addition to the command line 28 and the menu label row 30. The user must first locate the desired physical quantity, VOL 60. Since VOL is in the highlighted top row, it also appears in the menu label row 30, and the user need not select another row.

Once the user has selected a row containing the desired menu option (54–56), the user may then select the menu option by pressing the menu key 36 corresponding to the menu label (58). For example, the third menu key from the left corresponds to VOL 60 reproduced in the menu label row 30. In the case of the selection of a unit, the selection of a VOL results in the display of a subcategory screen 62 (64). This particular subcategory includes several units for the single physical quantity of volume. When the subcategory includes an array of menu options such as units of volume 66 in this example, the user may then repeat the steps of selecting a row (51–56) and then selecting the user option by depressing an appropriate menu key 36 (58). In general, when a user presses a menu key 36, the processor 14 could be programmed to execute various functions including but not limited to displaying a symbol on the screen, storing data entered in memory, or performing a mathematical calculation.

Referring again to the example illustrated in FIG. 2 and the accompanying flow chart of FIG. 3, the user must again locate the desired option, milliliters (ML 65), highlight the row containing the option (55, 56), and then select the option by depressing a menu key associated with the menu option (58). In this example, "ML" 65 is located in the third highlighted row, and the user depresses the down arrow key 48 twice to highlight the third row (54–56). Since the user wants to add a numeric value to the unit, the user first keys in the number "3.5," using the appropriate numeral and symbol keys, before pressing the menu key corresponding to "ML" (58). In response, the processor 14 appends the "ML" unit to the numeral, "3.5," on the LCD display unit 16, (68). As discussed below, the user has the option to divide by the unit or perform a conversion function by using a control key in combination with the menu key.

To exit the routine of FIG. 3, the user may press a key marked CANCEL 70 on the keyboard 12. When a user depresses the CANCEL key 70, the processor interrupts the execution of the program illustrated in FIG. 3, regardless of the step, and returns the display unit to the display from which the user entered the menu array. After exiting the menu, the display will include the data entered while the user accessed the menu. In particular, when the user has created a unit as in the example in FIG. 2, the user may exit the units program by pressing CANCEL 70, and the display unit 16 will display the entered data, "3.5_ml."

With respect to creating a unit, the invention includes various other features. When the user wishes to create a unit without specifying a numeric value, the processor defaults by assigning a value of 1 to the unit. Additionally, if the user wishes to create a unit using multiple physical quantities, the user may switch to the main units array 50 using the left arrow control key 31 (72), or operating a control key 74 marked "NXT" in combination with a menu key, labeled "UNITS." In general, the processor may be programmed to return to a previous array (73) when a user presses the left arrow key 31 (72).

In response to depressing certain control keys such as the NXT key 74, the processor 14 instructs the display unit 16 to display a new row of menu options in the menu label row, temporarily, so that the menu keys can provide additional menu options. Depending on the number of menu options programmed for each control key like the NXT key 70, the user may view or select a number of options in addition to those provided in an array of menu options 50, 66. In response, the processor will locate the appropriate options for display and execute those options if a user presses a corresponding menu key.

The processor 14 may also be operably coupled to control keys that increase the number of menu labels available for each position in the array of menu options. For example, in the preferred embodiment, operation of control keys 42, 44 in combination with a menu key instructs the processor to either divide by a unit in the array or to convert a stored unit to a chosen unit of the array. When a unit containing multiple physical quantities has terms in the denominator, the user may place a unit in the denominator by depressing the right shift control key 42 in combination with an appropriate menu key 36 (76–80). A user may convert a stored object unit to a user chosen unit by pressing the left shift key 44 in combination with a menu key 36 corresponding to the chosen unit (82–84). Alternatively, the user may convert a unit by creating a target unit and pressing the NXT key 74 in combination with a menu key labeled "CONV," a menu option temporarily loaded into the menu label row in the manner described above.

The details and unique features described above are only examples of the apparatus and methods described herein and should not be construed as limitations on the invention. Keys of the apparatus may serve dual functions as row selector keys as well as menu keys. Further, one could rearrange or alter the described method steps without departing from the principles of the present invention. For example, it is possible to select among menu options using row selector keys and menu keys without highlighting a selected row specifically as described. As long as the display unit provides an indicator of the selected row, such as a cursor for example, a user may display and select user options using the apparatus and methods of the invention.

While I have described the invention in the context of creating scientific units, it should be understood that it can be used to enhance the ease and efficiency with which a user may execute a wide range of complex calculations on a calculating device. The method may be used in connection with numerous functions, including and not limited to executing mathematical functions or combinations of functions, displaying symbols, creating programs or building equations with several variables.

Having illustrated and described the principles of the invention in a preferred embodiment, it should be apparent to those skilled in the art that the invention can be modified in arrangement and detail without departing from such principles. I claim all modifications and equivalents coming within the spirit and scope of the following claims.

I claim:

1. A method for selecting functions using a first number of menu keys, the method comprising the steps of:
   (a) in response to a first user command, displaying on a display a second number of function categories, the second number being greater than the first number, including the substep of:
      (a.1) highlighting a third number of the function categories, the third number being equal to the first number, wherein each highlighted function category is associated with one of the menu keys, and wherein each highlighted function category is additionally displayed adjacent to the menu key associated with the highlighted function category;
   (b) in response to the user selecting a first menu key, displaying on the display a fourth number of functions, the fourth number being greater than the first number, wherein the functions displayed are within a first highlighted function category associated with the first menu key, including the substep of:
      (b.1) highlighting a fifth number of the functions, the fifth number being equal to the first number, wherein each highlighted function is associated with one of the menu keys; and,
   (c) in response to the user selecting a second menu key, performing a first function associated with the second menu key.

2. A method as in claim 1 wherein:
   in step (a) each function category is a category of units of measure;
   in step (b) each function is a unit of measure; and
   in step (c) performing the first function includes appending a selected unit of measure to a numeric value.

3. A method as in claim 1 wherein in substep (b.1) each highlighted function is displayed adjacent to the menu key associated with the highlighted function.

4. A method as in claim 1 wherein step (a) additionally includes the following substep:
   (a.2) in response to a second user command,
      ceasing to highlight the third number of the function categories, and
      highlighting a sixth number of the function categories, the sixth number being equal to the first number, wherein each of the sixth number of the highlighted function categories is associated with one of the menu keys.

5. A method as in claim 4 wherein step (b) additionally includes the following substep:
   (b.2) in response to a third user command,
      ceasing to highlight the fifth number of the displayed functions, and
      highlighting a seventh number of the displayed functions, the seventh number being equal to the first number, wherein each of the seventh number of displayed functions is associated with one of the menu keys.

6. A method as in claim 5 wherein the third user command includes the user depressing a first key on a keyboard and the second user command includes the user depressing a second key on the keyboard.

7. A method as in claim 1 wherein step (a), includes displaying the second number of function categories arranged in a sixth number of columns, the sixth number being equal to the first number.

8. A method as in claim 7 wherein step (a.1) includes highlighting one displayed function category in each column.

9. A method as in claim 1 wherein step (b), includes displaying the fourth number of functions arranged in a sixth number of columns, the sixth number being equal to the first number.

10. A method as in claim 9 wherein step (b.1) includes highlighting one displayed function in each column.

11. A method as in claim 1 wherein the first user command includes a user depressing a combination of at least one key on a keyboard.

12. A computing system comprising:
   a display;
   a first number of menu keys;
   a display controller, including
      first display means, coupled to the display, for displaying a second number of function categories on the display in response to a first user command, wherein
         the second number is greater than the first number,
         the first display means highlights a third number of the function categories,
         the third number is equal to the first number, and
         each highlighted function category is associated with one of the menu keys, and
      second display means, coupled to the display, for displaying a fourth number of functions in response to the user selecting a first menu key, wherein
         the functions displayed are within a first highlighted function category associated with the first menu key,
         the second display means highlights a fifth number of the displayed functions,
         the fourth number is greater than the first number,
         the fifth number is equal to the first number, and
         each highlighted function is associated with one of the menu keys; and,
   performance means for, in response to the user selecting a second menu key, performing a first function associated with the second menu key;
   wherein the first display means additionally displays each highlighted function category adjacent to the menu key associated with the highlighted function category, and the second display means displays each highlighted function adjacent to the menu key associated with the highlighted function.

13. A computing system as in claim 12 wherein each function category is a category of units of measure, each function is a unit of measure, and the performance means performs the first function by appending a selected unit of measure to a numeric value.

14. A computing system as in claim 12 wherein the first display means includes means for, in response to a second user command, ceasing to highlight the third number of the function categories, and highlighting a sixth number of the function categories, the sixth number being equal to the first number, wherein each of the sixth number of the highlighted function categories is associated with one of the menu keys.

15. A computing system as in claim 14 wherein the third user command includes the user depressing a first key on a keyboard.

16. A computing system as in claim 12 wherein the first display means displays the second number of function categories arranged in a sixth number of columns, the sixth number being equal to the first number.

17. A computing system as in claim 16 wherein the display means highlights one displayed function category in each column.

18. A computing system as in claim 16 wherein the second display means displays the fourth number of functions arranged in a seventh number of columns, the seventh number being equal to the first number.

* * * * *